United States Patent
Billsberry

(10) Patent No.: US 8,744,800 B1
(45) Date of Patent: Jun. 3, 2014

(54) ADAPTIVE DME TRANSMITTER ARCHITECTURE

(75) Inventor: Mark Billsberry, Indialantic, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 343 days.

(21) Appl. No.: 13/239,819

(22) Filed: Sep. 22, 2011

(51) Int. Cl.
*G01C 23/00* (2006.01)
*G01S 5/02* (2010.01)
*G01S 11/02* (2010.01)
*G01S 1/30* (2006.01)
*G01S 3/02* (2006.01)

(52) U.S. Cl.
CPC . *G01S 5/02* (2013.01); *G01S 11/02* (2013.01); *G01S 1/30* (2013.01); *G01S 3/02* (2013.01)
USPC ............ 702/150; 342/159; 342/160; 702/144

(58) Field of Classification Search
CPC ............. G01S 1/30; G01S 11/02; G01S 5/02; G01S 3/02; G01S 13/5246; G01S 13/913; G01S 13/872; G01S 13/726; G01S 5/0231; G01S 19/48

USPC ............... 702/66, 75, 85, 86, 92, 94, 97, 106, 702/123, 124, 143, 144, 149, 150, 158; 342/159, 160
See application file for complete search history.

(56) References Cited

U.S. PATENT DOCUMENTS

2008/0111731 A1 * 5/2008 Hubbard et al. ............... 342/160

* cited by examiner

*Primary Examiner* — John H Le
(74) *Attorney, Agent, or Firm* — Donna P. Suchy; Daniel M. Barbieri

(57) ABSTRACT

A distance measuring, device including a lookup table storing values to calibrate a Class AB amplifier to produce a pulse pair with the desired characteristics. The distance measuring device analyzes the characteristics of the output signal and recursively adapts the values stored in a lookup table to force the output the power amplifier to meet the required performance characteristics.

15 Claims, 4 Drawing Sheets

ADAPTIVE DME TRANSMITTER ARCHITECTURE

FIELD OF THE INVENTION

The present invention is directed generally toward distance measuring equipment, and specifically toward distance measuring equipment with software defined radio architecture.

BACKGROUND OF THE INVENTION

Distance measuring equipment (DME) is a transponder based radio technology that measures distance by timing the propagation delay of radio signals. Aircraft use DME to determine their distance from a land-based transponder by sending and receiving two pulses of fixed duration and separation (pulse pairs).

An aircraft communicates with a ground transponder using a series of pulse pairs (interrogations) and, after a precise time delay (50 microseconds for Mode X or 56 microseconds for Mode Y), the ground station relies with a pulse pair with the correct spacing. The DME receiver in the aircraft searches for pulse-pairs with the correct time spacing (12 microseconds for Mode X and 30 microseconds for Mode Y).

Aircraft have several independent radios. Integrating the various L-Band radios on an aircraft would reduce the size, weight, power and cost of the radios. However, DME transmitters are typically implemented using a saturated Class C amplifier with a drain modulator; integrating DME transmitters with other L-Band radios would be difficult to achieve using a saturated Class C amplifier with drain modulation transmitter architecture. Furthermore, some implementations of integrated L-Band radios may require extensive calibration under various operating conditions. extensive calibration may be prohibitive.

Consequently, it would be advantageous if a method and apparatus existed that are suitable for integrating various L-band radios into a single self-calibrating radio architecture.

SUMMARY OF THE INVENTION

Accordingly, the present invention is directed to a novel method and apparatus for integrating various L-band radios into a single self-calibrating radio architecture.

One embodiment of the present invention is a software defined radio architecture with a Class AB amplifier. This embodiment utilizes an adaption loop that updates the values within a lookup table in order to maintain a defined pulse width, rise time, fall time and amplifier compression point. A low-pass filter then interpolates between the points of the lookup table.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles.

BRIEF DESCRIPTION OF THE DRAWINGS

The numerous objects and advantages of the present invention may be better understood by those skilled in the art by reference to the accompanying figures in which.

DETAILED DESCRIPTION OF THE INVENTION

Reference will now be made in detail to the subject matter disclosed, which is illustrated in the accompanying drawings. The scope of the invention is limited only by the claims; numerous alternatives, modifications and equivalents are encompassed. For the purpose of clarity, technical material that is known in the technical fields related to the embodiments has not been described in detail to avoid unnecessarily obscuring the description.

Figure 1:
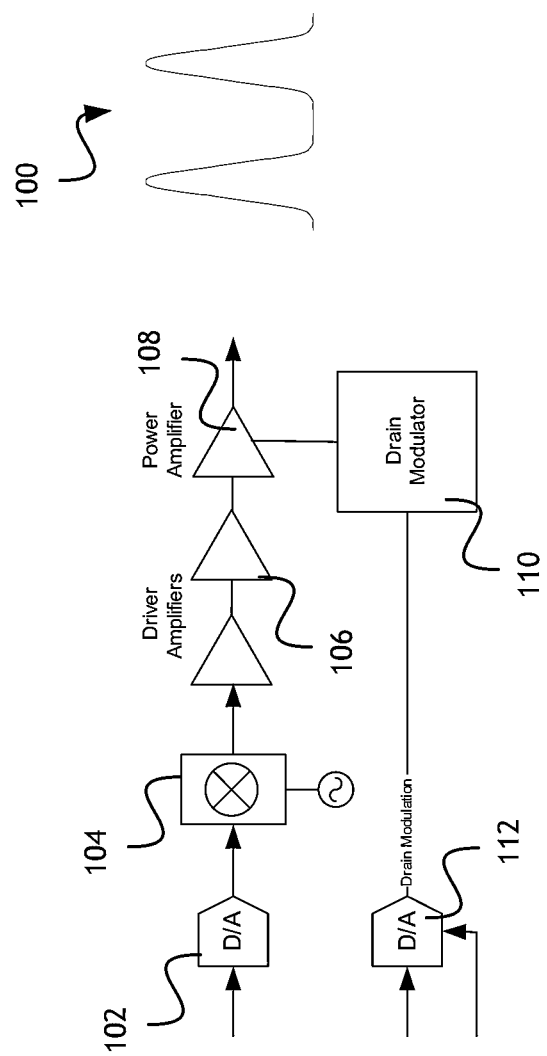
FIG. 1 shows a block diagram of one implementation of distance measuring equipment.

Referring to FIG. 1, a DME that generates a pulse pair 100 having desired characteristics may include a signal generator 104, one or more driver amplifiers 106, a Class C power amplifier 108, and a drain modulator 110. The DME may also include digital-to-analog (D/A) converters 102, 112 to control the function of the signal generator 104 and drain modulator 110. The signal generator 104 may produce an input signal; the input signal may be amplified by the one or more driver amplifiers 106 for use by the Class-C power amplifier 108. The Class-C power amplifier 108 may operate at saturation to produce the pulse pair 100. The drain modulator 110 may alter the supply voltage of the Class-C power amplifier 108 to create the desired pulse pair 100 shape.

DME generally operates in the L-Band, as do other radios commonly found in aircraft. It is desirable to integrate the various L-Band radios to reduce the size, weight, cost and power consumption of an aircraft's radio equipment. However, it would be difficult to integrate multiple radios using Class-C power amplifiers with drain modulation because the drain modulation must be precisely tuned to achieve the desired pulse pair and the circuit is therefore unsuitable for any other purpose.

A software defined radio architecture having a Class AB amplifier may be suitable for integrating various L-Band radios in an aircraft. One problem with using a Class AB amplifier is that the Class AB amplifier does not behave linearly, especially when driven close to saturation. Furthermore, the amplifier may behave differently under different thermal conditions; a Class AB amplifier would therefore require extensive calibration related to the anticipated operating conditions.

Figure 2:
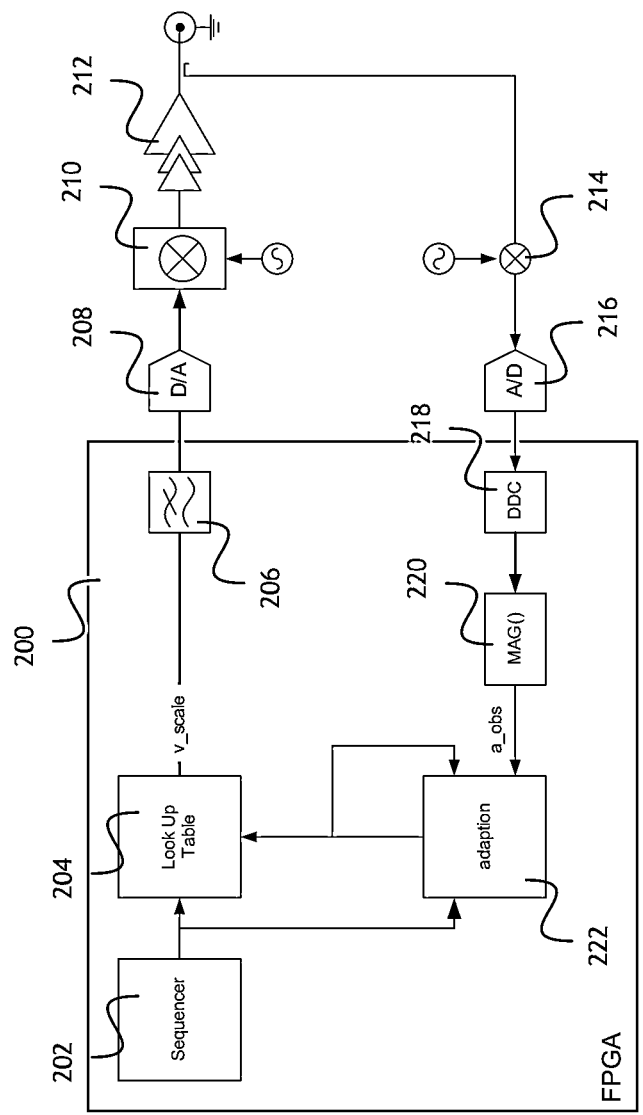
FIG. 2 shows a block diagram of one implementation of distance measuring equipment with an adaption loop.

Referring to FIG. 2, a self calibrating software defined radio for producing a pulse pair 100 is shown. The self calibrating software defined radio may include a lookup table 204, an adaption processor 222 and an interpolation filter 206. The self calibrating software defined radio may also include a sequencer 202 connected to the lookup table 204 and the adaption processor 222 to control the execution of an adaption loop. An adaption loop is a recursive process executed by the adaption processor 222 to modify values stored in the lookup table 204 according to an output.

The interpolation filter 206 may be connected to a signal generator 210 to produce an input for a Class AB amplifier 212. A digital-to-analog converter 208 may also functionally interpose between the interpolating filter 206 and the signal generator 210. The output from the Class AB amplifier 212 may be a pulse pair 100. The output from the Class AB amplifier 212 may be applied to a down-converting mixer 214 connected to an analog-to-digital converter 216 to produce a digital signal for processing in an adaption loop.

The self calibrating software defined radio may be implemented in a field-programmable gate array (FPGA) 200. Where the self calibrating software defined radio is implemented in a FPGA 200, the digital signal from the analog-to-digital converter 216 may be connected to a digital down converter (DDC) 218. The DDC 218 may convert the signal from the analog-to-digital converter 216 to a lower sampling rate complex baseband signal for processing in the adaption loop. The DDC 218 may be connected to a magnitude function (MAG) 220, converting the complex baseband signal into an amplitude signal useable in the adaption loop. The MAG processed down sampled digital signal may comprise a representation of the pulse pair amplitude at the output of the Class AB amplifier 212. The adaption processor 222 may analyze the received digital amplitude signal in order to determine if the performance parameters of the pulse pair output signal produced by the Class AB amplifier 212 accurately match the predefined characteristic values stored in the adaption processor 222. If the adaption processor 222 determines that the pulse pair output signal does not conform to the predefined required characteristic values stored in the adaption processor 222, the adaption processor 222 may modify the values in the lookup table 204 in order to force the output of the Class AB amplifier 212 to more closely match the predefined required performance parameters.

A software defined radio according to FIG. 2 may recursively self-calibrate as operating conditions alter the performance of the Class AB amplifier 212, thereby obviating the need to manually calibrate the system.

Figure 3:
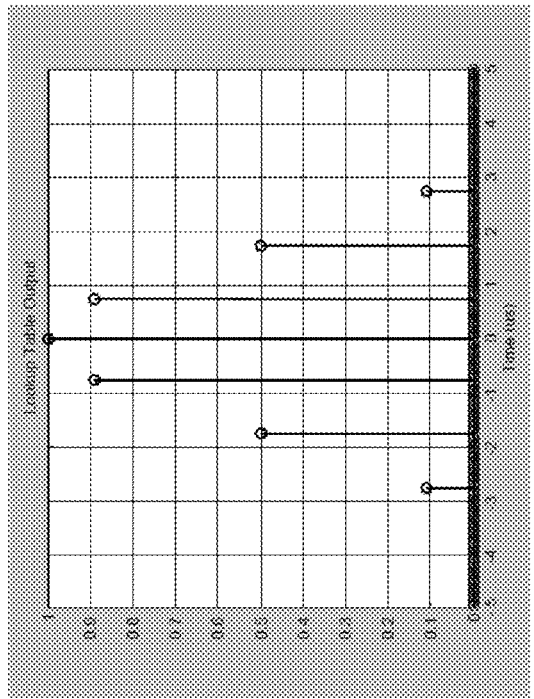
FIG. 3 shows a graphic representation of a lookup table.

Referring to FIG. 3, a representation of output from the lookup table 204 is shown. An interpolating filter 206 may receive the output from the lookup table 204 and produce an interpolated signal. The interpolating filter 206 may comprise a low pass filter.

Figure 5:
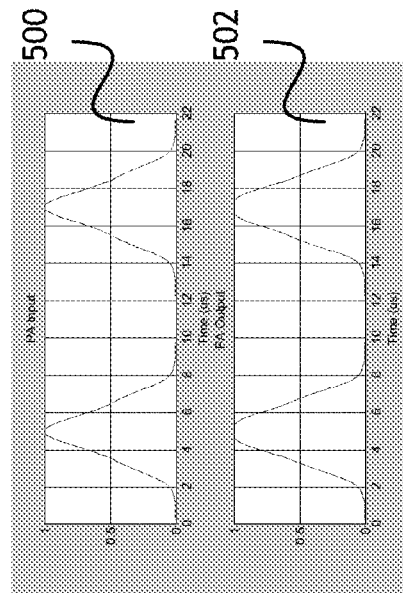
FIG. 5 shows a graphic representation of power amplifier input versus output in DME with an adaption loop.
Figure 4:
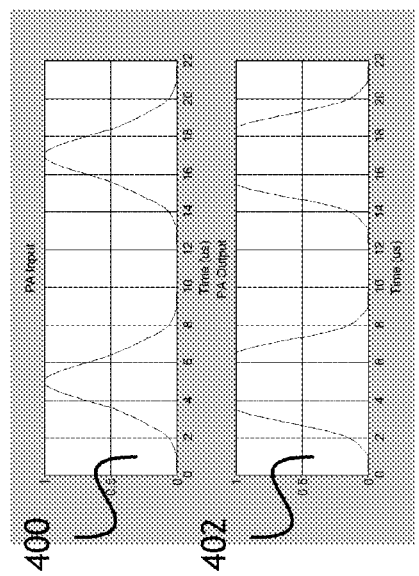
FIG. 4 shows a graphic representation of power amplifier input versus output in DME without an adaption loop.

Referring to FIG. 4 and FIG. 5, FIG. 4 shows a graphical representation of an input signal 400 and the corresponding output signal 402 in a DME utilizing a Class AB amplifier 212 without utilizing an adaption loop. Without an adaption loop, an output signal 402 may deform during processing. FIG. 5 shows a graphical representation of an input signal 500 and the corresponding output signal 502 in a DME utilizing a Class AB amplifier 212 with an adaption loop. The adaption loop may continuously update the input values in the lookup table 204 to accommodate varying performance parameters of the Class AB amplifier 212 according to varying thermal conditions.

Figure 6:
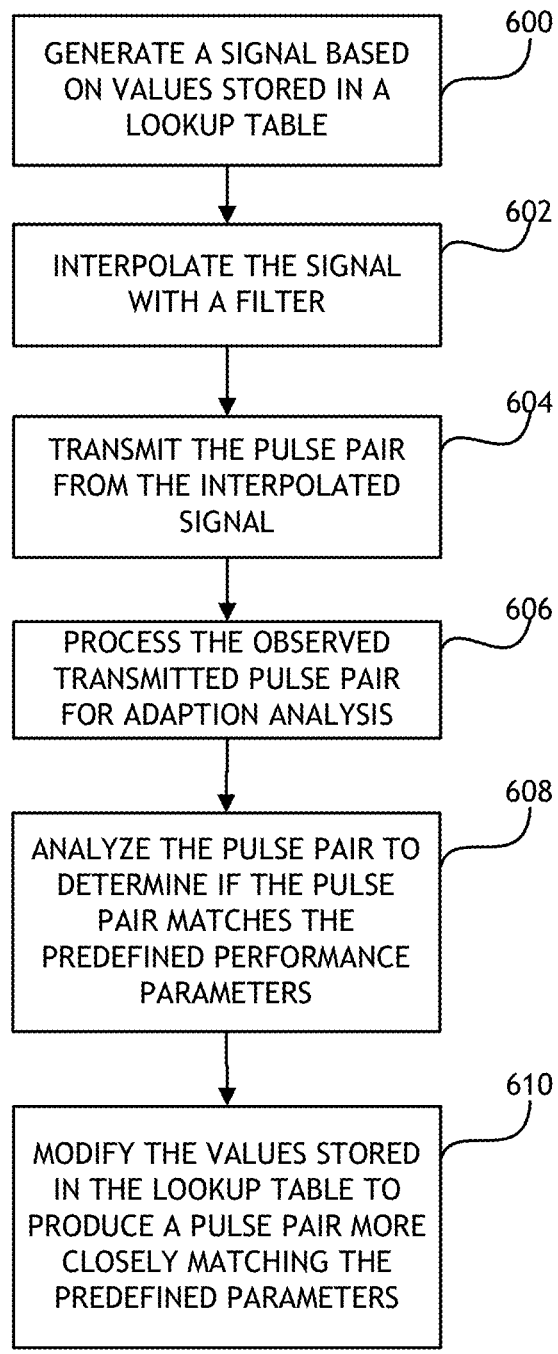
FIG. 6 shows a flowchart of a method for updating a lookup table of values.

Referring to FIG. 6, a flowchart of a method for modifying values in a lookup table 204 to produce a pulse pair signal 100 utilizing a Class AB amplifier 212. The method may include generating 600 a signal based on values stored in a lookup table 204. The values in the lookup table 204 may control the pulse power, pulse width and rise and fall time requirements of a DME. An interpolating filter 206 may then receive the signal and interpolate 602 a complete pulse or waveform. A signal generator 210 and Class AB amplifier 212 may then generate 604 a pulse pair 100 based on the interpolated signal. Under certain thermal conditions, the Class AB amplifier 212 may not produce the desired pulse pair 100 from the interpolated signal. In that case, the pulse pair 100 may be processed 606 to produce an adaption comparison signal. Processing 606 may include converting the pulse pair to a digital signal, down-sampling the digital signal to a sampling rate more easily analyzed by an adaption processor, and converting the complex down sampled signal into an amplitude signal. An adaption processor 222 may then analyze 608 the processed pulse pair to determine whether the pulse pair 100 conforms to the predefined performance parameters store within the adaption processor 222. If the pulse pair 100 does not conform to the parameters defined in the lookup table 204, the adaption processor 222 may modify 610 the values in the lookup table 204 to produce a pulse pair more closely matching the parameters as originally defined in the adaption processor 222.

By this method, a DME utilizing a Class AB amplifier 212 may self-calibrate to produce pulse pairs 100 with consistent characteristics even as operating conditions change. Various L-Band radios may thereby utilize the same software defined radio by altering the lookup table of values to produce a desired self-calibrating signal.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A software defined radio for use in a distance measuring device comprising:
   a processor;
   a memory connected the processor;
   one or more amplifiers connected to the processor, at least one of the one or more amplifiers comprising a Class AB amplifier, the one or more amplifiers configured to produce a pulse pair signal; and
   computer code configured to execute on the processor,
   wherein the computer code is configured to instruct the processor to:
      maintain a lookup table of values;
      generate an output based on the values;
      analyze the output; and
      modify the lookup table of values.

2. The software defined radio of claim 1, further comprising one or more filters that interpolate the lookup table of values to produce an input signal.

3. The software defined radio of claim 2, wherein the one or more filters comprise low-pass filters.

4. The software defined radio of claim 1, further comprising a digital down converter that samples the output for analysis.

5. The software defined radio of claim 1, wherein the computer code is further configured instruct the processor to generate a new output based on a modified lookup table of values.

6. A distance measuring device comprising:
   a processor;
   a memory connected to the processor, configured to maintain a lookup table of values;
   one or more filters connected to the processor, configured to interpolate a signal from the lookup table of values;
   one or more amplifiers connected to the one or more filters, configured to produce an output, at least one of the one or more amplifiers comprising a Class AB amplifier; and
   computer code configured to execute on the processor,
   wherein the computer code is configured to:
      analyze the output; and
      modify the lookup table of values.

7. The distance measuring device of claim 6, wherein at least one of the one or more filters comprises a low-pass filter.

8. The distance measuring device of claim claim 6, wherein the one or more amplifiers are configured to produce a pulse pair output based on the signal interpolated from the lookup table of values.

9. The distance measuring device of claim 6, further comprising a digital down converter that samples the output for analysis.

10. The distance measuring device of claim 6, wherein the computer code is further configured to generate a new output based on a modified lookup table of values.

11. A method of calibrating the output of a software defined radio comprising:

generating, via a class AB amplifier, an output comprising a pulse pair based on a lookup table of values, wherein the lookup table of values defines one or more characteristics of the output;

processing the output of the class AB amplifier to produce a processed signal;

analyzing, via the processor, the processed signal to determine if the output of the class AB amplifier conforms to the one or more characteristics defined by the lookup table of values; and modifying, via the processor, the lookup table of values.

12. The method of claim 11, wherein generating the output based on a lookup table comprises interpolating the lookup table with one or more interpolating filters.

13. The method of claim 12, wherein at least one of the one or more interpolating filters comprises a low-pass filter.

14. The method of claim 11, wherein processing the output to produce the processed signal is performed by a digital down converter.

15. The method of claim 11, further comprising generating, via a class AB amplifier, a new signal based on one or more modified values stored in the lookup table.

* * * * *